United States Patent [19]

Daigger et al.

[11] Patent Number: 5,480,548
[45] Date of Patent: Jan. 2, 1996

[54] WASTEWATER BIOLOGICAL PHOSPHORUS REMOVAL PROCESS

[75] Inventors: Glen T. Daigger, Englewood, Colo.; Joseph P. Stephenson, Kitchener, Canada; Daniel A. Nolasco, Hamilton, Canada; Dalton R. Stafford; Douglas M. Kaupp, both of Lethbridge, Canada

[73] Assignee: CH2M Hill, Inc., Englewood, Colo.

[21] Appl. No.: 174,350

[22] Filed: Dec. 28, 1993

[51] Int. Cl.$^6$ ............................................ C02F 3/30
[52] U.S. Cl. .................. 210/605; 210/607; 210/621; 210/903; 210/906
[58] Field of Search .................. 210/605, 607, 210/621, 622, 623, 624, 630, 903, 906

[56] References Cited

U.S. PATENT DOCUMENTS

| | | | |
|---|---|---|---|
| 3,994,802 | 11/1976 | Casey et al. | 210/605 |
| 4,183,809 | 1/1980 | Klapwijk et al. | 210/605 |
| 4,488,968 | 12/1984 | Hong et al. | 210/605 |
| 5,160,043 | 11/1992 | Kos | 210/630 |
| 5,288,405 | 2/1994 | Lamb, III | 210/906 |

FOREIGN PATENT DOCUMENTS 59-98800   6/1984   Japan.

OTHER PUBLICATIONS

"Operational Results of the Wolfsburg Wastewater Treatment Plant", R. Kayser, G. Stobbe and M. Werner, *Wat. Sci. Tech.*, vol. 25, No. 4–5, pp. 203–209.

Primary Examiner—Christopher Upton
Attorney, Agent, or Firm—Burns, Doane, Swecker & Mathis

[57] ABSTRACT

The present invention relates to a process for treating wastewater utilizing a step feed return activated sludge process. The wastewater is directed via one or more step feed points through a mainstream process. The step feed point includes at least one aerobic zone and at least one anoxic zone, in repeating or alternating sequence. A portion of effluent from the one or more anoxic zones are fed through at least one anaerobic zone to which raw or pretreated wastewater is fed and returned to the upstream portion of the anoxic zone. Additionally, return activated sludge may be recycled to one or more of the anoxic zones.

10 Claims, 2 Drawing Sheets

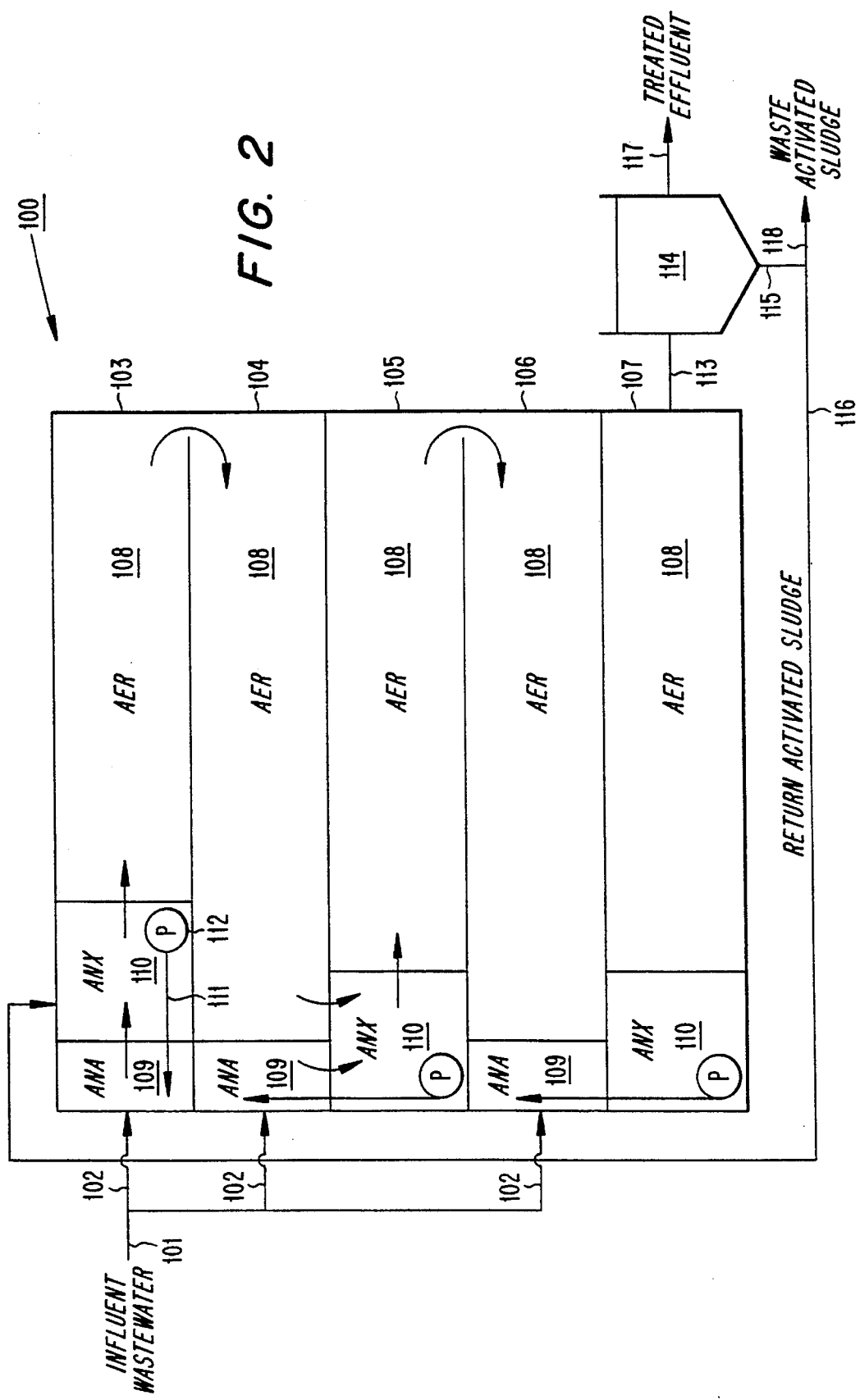

WASTEWATER BIOLOGICAL PHOSPHORUS REMOVAL PROCESS

FIELD OF THE INVENTION

The present invention relates to a process for treating wastewater by active biomass contained in recycled sludge, to effect removal of nitrogen and phosphate values in addition to removal of biochemical oxygen demand (BOD).

BACKGROUND OF THE INVENTION

During recent years, the discharge of treated effluents has necessitated high wastewater treatment requirements at both the state and federal levels. Of particular concern is the increase in phosphates and nitrogen in the effluents which result in water bodies becoming enriched with plant nutrients causing a proliferation of water plants and algae which, in turn, result in various water purification and health problems. The effective removal of pollutants from wastewaters, particularly carbonaceous materials and nutrients such as nitrogen and phosphorus, has also become increasingly important in efforts to supplement and reuse existing municipal water resources.

Nitrogen and phosphorus concentrations in water sources have increased considerably due, in part, to chemical fertilizers which contain a substantial amount of nitrogen and phosphorus. This creates an increasing problem to public health because high levels of nitrate in drinking water can cause serious illness in human beings. As such, removal of substantial amounts of phosphorus and nitrate from water sources has become necessary to provide a clean municipal water supply.

The presence of organic materials in water also results in fungal and other heterotrophic growths and deoxidation of the water (due to the metabolic activities of the growths) which render the water unsuitable for higher life forms such as fish. These aerobic conditions also cause fermentation and redissolution of heavy metal salts. These net effects reduce the aesthetic appearance, recreational use and reuse of the water.

In the past, a wide range of physical, chemical and biological processes have been proposed for eliminating pollutants in existing wastewater streams, particularly carbonaceous material and unwanted nutrients. Other efforts have focused on the reduction of total suspended solids in treated effluents. The so-called "biological" nutrient removal processes have been found particularly attractive for the treatment of municipal wastewaters since such treatment costs have generally been less than the cost associated with physical-chemical methods, and the characteristics of the wastewater are amenable to biological treatment.

In that regard, it has long been known that the quality of effluent may be improved under aerobic conditions in which bacteria metabolize the biodegradable organics, using dissolved oxygen as the terminal electron acceptor. Approximately one-third of the metabolized organics are oxidized to carbon dioxide and water to obtain the energy to convert the remaining two-thirds of the organics to microbial protoplasm. The major problem in basic aerobic treatment, however, is the enlarged volume of microbial solids to be processed.

In anaerobic systems, i.e., those operated in the absence of introduced oxygen, either elemental or derived from nitrates or nitrites, the bacteria must find another electronic acceptor. In anoxic systems, i.e., oxygen absent but nitrate present, chemically bound oxygen becomes the primary electronic acceptor such as, when nitrates are reduced to nitrites and various intermediates before being reduced to nitrogen gas. The denitrification results in the eventual production of nitrogen gas, which is insoluble in the wastewater, rather than in the production of ammonia or ammonium ions.

In order to remove phosphorus from wastewater, anaerobic conditions are utilized. This allows microorganisms to hydrolyze polyphosphate stored during prior oxidation processes, thereby releasing soluble phosphate to the mixed liquor in the anaerobic zone.

Because of the need to reduce the level of organic pollutants, as well as nutrients such as nitrogen and phosphorus, many conventional "biological" waste treatment systems have combined aerobic and anaerobic steps, generally with the anaerobic stage being the initial treatment step. One principal difficulty encountered with such combined processes is that time becomes a critical variable in designing and sizing the wastewater treatment system. A different time period is required to metabolize a given amount of organic matter by a unit of cell mass. By retaining the microbes in the treatment system, the treatment time per unit of organic matter is reduced. Because the time for aerobic treatment is controlled by oxygen transfer, contact between the microbes and the organic pollutants controls the total reaction time.

Unfortunately, the kinetics of nitrogen and phosphorus removal under anaerobic conditions are not always compatible with the treatment and removal of organic materials in an aerobic environment. For example, the rate of removal of phosphorus is a direct function of the concentration of organics. Thus, it is important to maintain higher concentrations of residual organics at a point during the process when phosphorus uptake rates can be optimized. As a result, the design of systems capable of using combined treatment mechanisms (aerobic, anaerobic and anoxic) have often been unduly complicated and expensive to install and operate.

During recent years, the activated sludge process has proven to be an effective means for the removal of biological oxygen demand (BOD) from wastewater and for producing high quality effluent with reduced total suspended solids concentrations. The process has been extensively described in the literature and, in general, includes the step of maintaining an aeration system in which the wastewater is fed to a suspension of microorganisms which are responsible for removing excess bacteria and producing a clarified effluent.

Because bacteria cannot metabolize solid organics, they convert certain solid particles to soluble organics prior to metabolism by virtue of enzymes in the cell surface capable of hydrolyzing the complex organics to simple organic molecules. It is known that the bacteria must have a suitable environment with all the proper nutrients. The environment must also provide good mixing for adequate contact between the microorganisms and the pollutants being metabolized and may involve an aerobic system with excess dissolved oxygen or an anoxic or anaerobic system without dissolved oxygen. In either case, the known activated sludge processes require sufficient nitrogen, phosphorus, iron and trace metals for good growth of the microorganisms, without high concentrations of heavy metals.

Typical wastewater treatment processes usually include multiple treatment areas or zones which can be roughly broken down into: (1) a preliminary treatment area; (2) a primary treatment area; and (3) a secondary treatment area. The wastewater treatment process begins with the preliminary treatment area. Preliminary treatment is concerned with removing grit and damaging debris, such as cans, bath towels, etc., from the untreated wastewater. This is usually a two-stage treatment process whereby the debris such as rags and cans are moved by screens and the grit and heavy inorganic solids settle out of the untreated wastewater as it passes through a velocity controlled zone. The damaging inorganic debris is thus removed by screening or settling while organic matter carried within the fluid stream passes on.

Following the preliminary treatment area, the wastewater is directed to a primary treatment area. The primary treatment area entails a physical process wherein a portion of the organics is removed by flotation or sedimentation. The organics removed include feces, food particles, grease, paper, etc., and are technically defined as suspended solids. Usually 40 to 70% of the suspended solids are removed in this primary stage. The third treatment stage is called secondary treatment and is usually a biological treatment process where bacteria are utilized under controlled conditions to remove nutrients or nonsettling suspended and soluble organics from the wastewater. These materials would result in an unacceptable biological oxygen demand (BOD) if left untreated. Typically, one mode of this process consists of a basin in which the wastewater is mixed with a suspension of microorganisms. This mixture is then aerated to provide oxygen for support of the microorganisms which may then absorb, assimilate, and metabolize the excess biological oxygen demand in the wastewater. After sufficient retention time, the mixture is then introduced into a clarifier or settler into which the biomass separates as settled sludge from the liquid. The purified fluid then overflows into a receiving stream.

There are three principal types of secondary treatment for affecting treatment of wastewater. The first type, known as a trickling filter, allows the wastewater to trickle down through a bed of stone whereby the organic material present in the wastewater is oxidized by the action of microorganisms attached to the stone. A similar concept is the RBC, or the rotating biological contactor, wherein the biology is attached to the media which rotates in the wastewater and purifies it in the manner of a trickling filter. The second method is an activated sludge process in which the wastewater is fully aerated and agitated by either compressed air or mechanical means together with a portion of the biomass or activated sludge which has been returned from the clarifier or settler. The third process may be referred to as a semi-aerobic (anaerobic/aerobic) process in which the first stage is anaerobic or anoxic, followed by an aerobic stage. This anaerobic-anoxic-aerobic process is very similar to the initial stages of the Phoredox process and the modified Bardenpho process, known well in the wastewater treatment industry.

This anaerobic-aerobic process was first disclosed in U.S. Pat. Nos. 2,788,127 and 2,875,151 by Davidson. In the anaerobic-aerobic process, the untreated wastewater is first subjected to anaerobic treatment and then to aerobic decomposition. A portion of the sludge formed during the aerobic decomposition is recycled back and mixed with the untreated wastewater being subjected to anaerobic treatment. Davidson noted that the aerobic organisms in the recycled activated sludge are not impaired by passage through the anaerobic reactor and may, in fact, undergo unusual stimulation.

In recent years, there has been a great deal of work directed at biological processes for removing pollutants such as phosphorus and nitrogen from wastewater. This work has in large part been broadly based and has not been focused on specific problems and concerns. For example, many wastewater facilities are now facing very stringent phosphorus control standards. When there is already a wastewater treatment facility in place, it becomes prudent to consider the possibility of modifying these existing facilities in order to meet new standards being imposed. Obviously costs, both initial and operating, are of main concern. One important concern then is to evaluate the economics of modifying existing treatment facilities to accomplish biological phosphorus and nitrogen removal.

In U.S. Pat. No. 4,056,465 a modified activated sludge system is disclosed wherein BOD-containing wastewater and recycled sludge are initially admixed under anaerobic conditions in the substantial absence of oxygen or oxidizing agents and subsequently subjected to aeration and clarification. Nitrates and nitrites are removed by interposing an anoxic treating zone between the anaerobic zone and the aerating zone. The patent suggests that the initial admixture of the recycled sludge or biomass with the wastewater influent be under anaerobic conditions such that the basin or zone in which the mixed liquor is first formed is substantially free of nitrites or nitrates and dissolved oxygen.

In U.S. Pat. No. 4,271,026 there is described a wastewater treatment process for enhanced phosphorus removal at adequately high rate process operations. This is accomplished by maintaining a particular set of interrelated operating conditions within a specific envelope in the type of process where recycled activated sludge is mixed with a wastewater influent containing phosphate and BOD under anaerobic conditions, thereby promoting selective production of the desired type of microorganism.

In U.S. Pat. No. 4,488,968 a treatment of wastewater is described in which the wastewater influent is initially mixed with recycle active sludge in an anaerobic zone and then subjected to aeration in an aerobic zone, wherein the residence time of the mixed liquor in the aerobic zone is reduced. At least part of the sludge separated from the mixed liquor is subjected to further oxidation in a separate zone before admixture with the wastewater influent.

The process disclosed in U.S. Pat. No. 4,948,510 employs a plurality of basins which may be individually controlled to achieve anaerobic, anoxic or aerobic conditions. The basins are reconfigurable in that the flow of effluent to a basin, transfer of mix liquor between basins and effluent discharge from a basin can be varied to create a treatment cycle which has features of both continuous and batch processes while minimizing recycle rates and hydraulic level changes.

Other return activated sludge wastewater treatment processes have been disclosed which utilize various anoxic and aeration zones or cells to biologically remove phosphorus and nitrogen. For example, in U.S. Pat. No. 4,867,883 there is described a wastewater treatment process wherein the return sludge is denitrified by the mixed liquor suspended solids (MLSS) from a preceding anaerobic zone which receives an internal recycle from an anoxic zone. In U.S. Pat. No. 4,999,111 there is described a wastewater treatment process in which the return sludge is pretreated (nutrified) by unaerated contact of fermentation liquids produced from primary sludge. This contact is completed in one or more stages and the initial stage may be anoxic or anaerobic depending on the nitrate content of the return sludge. Additionally, in U.S. Pat. No. 4,956,094, a wastewater treatment process for the removal of phosphorus is described. This process involves the addition of carbonaceous oxygen demand (COD) or BOD containing liquors to a portion of the return activated sludge (RAS) which is mixed anaerobically and then settled to separate released soluble phosphates and the solids. The anaerobic mix zone consists of a pre-stripper followed by the settling unit with soluble phosphorus removed from the supernatant liquid by chemical precipitation.

Another method for removing nitrogen from wastewater includes the step feed activated sludge process. As described in a technical paper by Kaiser et al., the step feed process has been successful as applied to nitrification-denitrification wastewater treatment processes. Although some biological phosphorus removal was observed, performance was inconsistent. Therefore, the use of a step feed process to achieve consistent simultaneous biological nitrogen and phosphorus removal has not been discovered.

There have been attempts at biologically controlling nitrogen and phosphorus by incorporating an anoxic zone downstream from a series of preceding zones that would typically include aerobic and anaerobic zones. In order to remove and control those pollutants traditionally considered of prime importance, such as ammonia nitrogen, BOD, and phosphorus, these biological processes require that the anaerobic and aerobic zones be disposed in initial stages of treatment. For example, anaerobic zones, necessary for biological phosphorus removal, deplete microorganism food source, i.e., BOD. Consequently, by the time the wastewater mixed liquor has reached the downstream anoxic zone, there is very little, if any, food source for the microorganisms. Without food, the effectiveness of downstream denitrification is seriously hampered and usually inefficient. Besides that, the overall effectiveness of such a biological denitrification/dephosphorization process depends on flow in the overall makeup of the wastewater which can vary sharply from time to time.

Additionally, upstream aerobic zones which are required for the removal of nitrogen produce nitrites and nitrates which interfere with the efficient development of anaerobic conditions. Accordingly, previous phosphorus and nitrogen wastewater removal processes have not been able to consistently and adequately remove sufficient quantities of phosphorus and nitrogen simultaneously.

Therefore, there is a need for a biological denitrification/dephosphorization process which integrates anaerobic and aerobic zones to provide efficient removal of phosphorus and nitrogen. Additionally, there is a need for the application of such a process to existing wastewater treatment facilities without the need for additional tankage. Moreover, there is a need for a wastewater treatment process which can be retrofitted more easily onto small wastewater treatment plant sites having reduced tankage facilities.

SUMMARY OF THE INVENTION

The present invention relates to a wastewater treatment process that is particularly designed to remove phosphorus, nitrogen and other pollutants, simultaneously, from raw or pretreated wastewater. In particular, mixed liquor from at least one upstream aerobic zone first flows into at least one anoxic zone where it is denitrified. The denitrified mixed liquor is then recycled into at least one anaerobic zone, which may also receive a portion of the wastewater feed. The effluent from the at least one anaerobic zone then flows back to the forefront of the at least one anoxic zone, and from there, into at least one downstream aerobic zone.

In another preferred embodiment, the step feed process is utilized in a wastewater treatment process in which multiple step feed points are arranged in a series of consecutive treatment stages. Each step feed point comprises;

(a) treating wastewater influent in at least one aerobic zone;

(b) feeding effluent from the at least one aerobic zone through at least one anoxic zone;

(c) recycling a portion of effluent from the at least one anoxic zone to at least one anaerobic zone with raw or pretreated wastewater being fed directly into the at least one anaerobic zone;

(d) returning influent from at least one anaerobic zone to the at least one anoxic zone; and (e) feeding effluent from the at least one anoxic zone to at least one downstream aerobic zone.

This step feed process provides efficient phosphorus removal by increasing the mixed liquor suspended solids concentration within the treatment system with a reduction in total process reactor tankage of 20 to 40 percent. Moreover, this wastewater treatment process allows the use of inexpensive recycle pumping systems which can be retrofitted easily to a wide variety of treatment plants using existing treatment facilities.

BRIEF DESCRIPTION OF THE DRAWING

FIG. 2 of the drawing is a schematic view illustrating a process flow diagram for a multipass step feed wastewater treatment system according to the present invention.

DETAILED DESCRIPTION OF THE PREFERRED EMBODIMENTS

Figure 1:
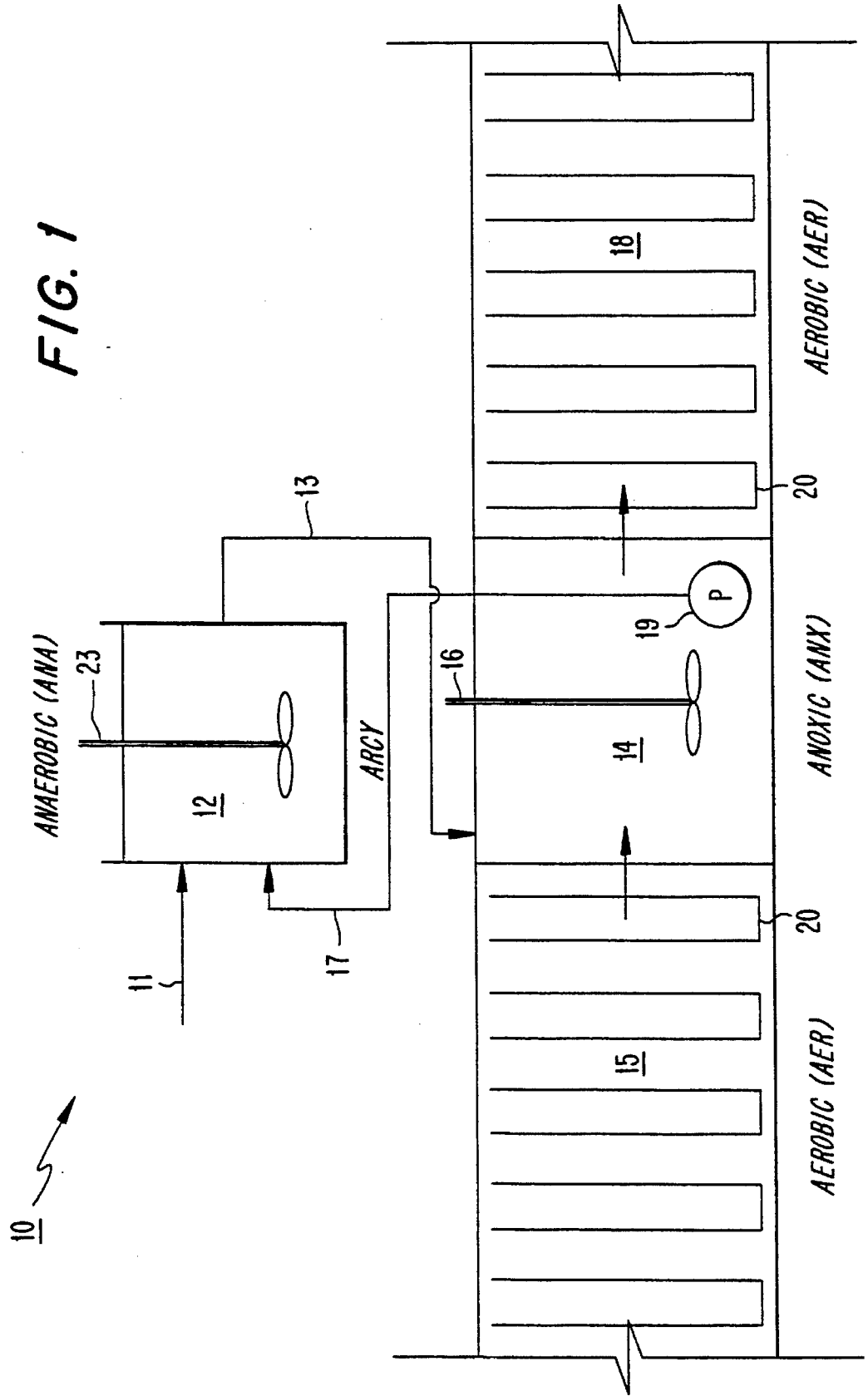
FIG. 1 of the drawing is a schematic view illustrating a process flow diagram for a step feed wastewater treatment system showing only the configuration at the step feed point according to the present invention.

The present invention concerns an activated sludge wastewater treatment process which removes BOD, nitrogen, phosphorus, and other pollutants from wastewater. This can be accomplished by using a step feed technique which allows the simultaneous removal of nitrogen and phosphorus.

In FIG. 1, there is illustrated a simplified wastewater treatment schematic 10 at a step feed point according to the present invention. The influent wastewater is introduced into the mainstream treatment process via a line 11 to one or more anaerobic zones 12 equipped with suitable mixers 23. In this zone, phosphate uptake is provided whereby microorganisms absorb incoming BOD from the influent waste water. Subsequent to the anaerobic zone 12, the waste water flows to anoxic zone 14 (also preferably equipped with a suitable mixer 16) via line 13. Mixed liquor from the upstream aerobic zone 15 (which will contain nitrate-nitrogen) is combined with the flow 13 from the anaerobic zone 12 in the initial portion of the anoxic zone 14 where it is denitrified. The denitrified mixed liquor (referred to as anoxic recycle or ARCY) is then recycled, for example, by using a suitable pump 19, into the anaerobic zone 12 via line 17 where it is mixed with fresh influent wastewater feed 11. The ARCY flow rate is preferably approximately equal to the plant influent flow rate. The effluent from the anaerobic zone 12 then flows back via line 13 into the anoxic zone 14 and, from there, into the downstream aerobic zone 18. The aerobic zones are provided with suitable aerating equipment, such as diffusers 20. This step feed configuration allows efficient use of the organics in the influent waste water, first for phosphorous removal and then to achieve a rapid rate of denitrification. This arrangement, illustrated in FIG. 1, may be provided at each step feed point in the wastewater treatment process.

Referring now to FIG. 2 of the drawing, the overall layout necessary for carrying out the activated sludge treatment method according to the invention is shown generally as 100. The layout depicts the steps and equipment which can be utilized in a plant and represents a complete liquid process flow schematic, with the exception of screening, preaeration, primary clarification and waste biosolids treatment. It should be noted that a wastewater treatment system is illustrated having three of the above-described step feed points, which include five basins, with each basin containing at least one aerobic zone. However, any number of basins and/or step feed points can be employed.

Pretreated influent 101 flows into the biological reactor 100. Prior to this, the pretreated influent 101 may be treated in a conventional manner to remove grit and damaging debris, such as cans, bath towels, etc. A conventional grinder pump may be positioned upstream of influent screens and thereby draws the influent into the plant. Fine mesh screens can be utilized which are designed to prevent the downstream plant facilities from clogging.

Subsequently, the influent 101 may flow or be pumped, using any suitable pump, such as screw pumps, into preaeration facilities (not shown), such as high density polyethylene containers. The air may be metered and introduced into the preaeration tank through a fine bubble diffuser.

Following optional preaeration, the wastewater may flow by gravity or pump into a suitable primary clarifier (not shown), such as a circular clarifier which separates solids from liquids. The clarifier may contain a galvanized steel effluent collection launder and may include means for removing sludge automatically or manually from the bottom of the clarifier through a valve and pipe.

After any such desired primary clarification, the influent 101 may be pumped to a holding tank or introduced directly into the biological reactor 100. From the holding tank the influent 101 may then be fed into the plant 100 at a suitable flow rate. The influent may be admixed with recycled mixed liquor suspended solids prior to introduction into the main treatment process. Any suitable tank or basin may be employed for this mixing step. Within each tank or basin there are positioned suitable mixing elements, such as conventional submersible mixers, to provide uniform influent solids content.

Influent then flows into the main treatment process/plant 100 via line 102 into at least one of the basins 103–107. Each of the basins 103–107 contains at least one aerobic zone 108. It should be understood that each of the zones mentioned may include more than one vessel or chamber. As illustrated in FIG. 2, the first basin 103 of the main treatment process 100 contains three zones, an anaerobic zone 109 followed by an anoxic zone 110 and then an aerobic zone 108. It should be understood that these zones may not necessarily all be incorporated in a single basin but could be separate basins and/or tanks. Each of the subsequent downstream basins 104–107 contain alternating aerobic zones 108 with anaerobic zones 109 and then anoxic zones 110.

Influent 101 flows into one or more of the anaerobic zones 109. Normally, a substantial portion of the influent 101 flows into the first anaerobic zone 109 in basin 103. However, equal amounts of influent wastewater 101 may be introduced in each anaerobic zone 109. Preferably, about 40 to 80 percent of the influent 101 flows into the first anaerobic zone 109 of the basin 103, and more preferably about 50 to about 70 percent. In this initial zone there is an absence of introduced oxygen, either elemental or derived from nitrate or nitrate sources.

It should be understood that the terms "anaerobic" and "anoxic" are not clearly or consistently defined in the literature wherein these terms are used. For the purposes of the present patent application, the term "anaerobic" is defined as the state existing within a wastewater treatment zone which is substantially free of nitrates and nitrites ($NO_x$). The term anoxic, as employed in the present application, is defined as the condition existing within a wastewater treating zone wherein BOD is metabolized by nitrates and/or nitrites. In the present application, the terms "aerated" and "aerobic" are used interchangeably. An "aerated" zone may contain oxygen in amounts up to about 2.0 mg/l or greater depending on the amount of oxygen deliberately introduced into the wastewater.

To assure that zone 109 is maintained under anaerobic conditions, anyone or more of the following techniques may be performed. The vessel or basin comprising zone 109 may be provided with a blanket of nitrogen, carbon dioxide or other inert gas at the liquid surface to avoid access thereto of atmospheric air. Alternatively, a loose-fitting or rigid cover may be provided at or above the liquid surface. Instead, or in addition thereto, nitrogen purge gas may be admitted into and bubbled up through the wastewater in zone 109 to strip any oxygen present. A ceramic diffuser, for example, may be used to strip the oxygen.

It is important to note that the wastewater 101 normally contains little or no nitrates or nitrites due to the reducing power of BOD in the presence of microorganisms in the influent 101. A potential source of nitrates and nitrites ($NO_x$) is from the return activated sludge obtained from the clarifier and recycle mixed liquor from the aerobic zones 108 as a result of nitrifying biological systems, i.e., those which effect oxidation of ammoniacal BOD to $NO_x$.

The anaerobic zone 109 may be of any suitable size. Because substantial quantities of incoming BOD are sorbed from the influent wastewater 101 in a relatively short amount of time, the anaerobic treatment is conducted for approximately 10 minutes to approximately 4 hours. Generally included in the anaerobic zone 109 are conventional submersible mixers that maintain suspended solids in suspension.

Following anaerobic treatment, the effluent then flows into an anoxic zone 110. In FIG. 2, for the purposes of illustration, there is shown one anoxic zone, but it is understood that the number of such zones can vary. Additionally, the anoxic zones 110 may also be part of a basin (as shown) or may comprise one or more individual vessels. The anoxic zones 110 may also contain mixers which recirculate the wastewater. These anoxic zones 110 function as denitrification zones inasmuch as they convert nitrate/nitrite-nitrogen in the influent coming into the zone to elemental nitrogen. While there may be oxygen present in a form combined with nitrogen ($NO_x$), there is no significant amount of dissolved oxygen present in the anoxic zone. Additional $NO_x$ concentration may be supplied by recycling return activated sludge 116 from the clarifier 114 to the initial portion of the anoxic zone 110 and also from mixed liquor recycled from the aerobic zone 108.

The wastewater being treated is held within each of the anoxic zones 110 for a selected period of time, e.g., generally ranging from about 20 to about 90 minutes. As pointed out above, this anoxic treatment serves to denitrify, that is, to reduce nitrate and nitrite ($NO_x$) levels in the wastewater. This can be accomplished because the microorganisms are continuing to seek oxygen and because of the absence of such in dissolved form, they start to reduce $NO_x$ compounds to nitrogen gas. This yields nitrogen in a stable form ($N_2$) and consequently permits the same to escape the liquid phase to the atmosphere.

At the end of the anoxic zone 110, a suitable submersible pump 112 is positioned at a point where it may return mixed liquors suspended solids (MLSS) via line 111 back to the entrance of the anaerobic zones 109. Because the MLSS from anoxic zones 110 are substantially free from dissolved oxygen and $NO_x$, further removal of phosphorus is achieved without interfering with the anaerobic process.

After anoxic treatment, the wastewater then flows into an aerobic aerating zone 108. This zone may include one or more vessels/basins. The aerating process may be conducted by supplying compressed air using a large power blower, e.g., 150 horse power blower, through fine bubble ceramic tube diffusers or spargers at the bottom of aerating zone 108. Instead of air, oxygen of any desired purity may be admitted to the aerobic zone 108. In addition, the aerobic zones 108 may contain strategically placed mixers which maintain uniform solids concentration throughout the cross-section of the zone 108 and/or to transfer oxygen.

As the oxygen/air proceeds through the wastewater, the biological process begins in which ammonia present in the wastewater, is oxidized. The amount of ammonia nitrogen in the wastewater may vary depending upon geographical location, season of the year, etc., but it is not uncommon for the wastewater to contain 10 to 30 PPM ammonia nitrogen.

Essentially, during the aerobic treatment stages, the supply of compressed air to the wastewater provides substantial oxygen to selected microorganisms which in turn results in the ammonia being oxidized, causing the ammonia nitrogen to be converted to a nitrite or nitrate form. The time or duration that the wastewater is subjected to such aerobic treatment may vary depending on the condition of the wastewater. Generally, however, the wastewater is subjected to aerating treatment for approximately 2 to approximately 10 hours.

The above-described process involving anaerobic-anoxic-aerobic zones may be repeated more than once in a plant designed to house numerous passes as shown in FIG. 2. Additionally, even though only five passes are shown in FIG. 2, more or less than five could be incorporated into the present process. Moreover, even though FIG. 2 illustrates influent wastewater being supplied at every anaerobic zone, the influent may be supplied to less than the total number of anaerobic zones. Moreover, one or more anaerobic or anoxic zones may be bypassed by any suitable bypass piping.

Following the last aerobic zone 108, the treated effluent is pumped via line 113 to clarifier 114. Sludge settles in the clarifier 114 and is drawn off via line 115. This sludge 115 may be directed to the return sludge line 116. To rid the system of excess sludge, there is provided an excess sludge discharge line 118 for selectively discharging certain quantities of sludge, referred to as waste activated sludge, over a given period of time. This sludge is directed to sludge digestors or other suitable sludge disposal means. Therefore, it is appreciated that the present wastewater treatment process produces sludge in selective quantities which are recycled through a side stream return sludge line 116. This sludge is referred to as return activated sludge (RAS).

The return activated sludge recycled through line 116 may be further treated prior to its introduction to the process. For example, the sludge may be subjected to conventional nitrification in a separate nitrification chamber to increase the level of microorganisms needed to remove phosphorous from influent waste water. This may include fermentation which produces acid and nitrification. The nitrification tank/chamber may be essentially anaerobic although the return sludge input could be anoxic.

The present step feed activated sludge waste water treatment process may be utilized in waste water treatment facilities having various capacities. For example, the present process may treat more than five million gallons per day of raw waste water. In such a process, it is estimated that the return activated sludge and its mixed liquor suspended solids recycle would be approximately 30 to 60% of the influent waste water. In addition, in such a process, it is contemplated that the life (mean residence time) of the activated sludge would be approximately 5 to 30 days.

It is believed that reductions of phosphorous of greater than 90% may be achieved. Further, one may expect a 97% reduction in ammonia and 50% reduction in total nitrogen. Of course, actual performance of the system will be site specific and based upon the actual flow rate versus the design flow rate. The process is expected to work optimally at between 60 to 100% of design flow.

The following example further illustrates the present invention and demonstrates the advantages of the present invention as compared against conventional step feed waste water treatment processes. It should be understood, however, that the specific details set forth in the examples are merely illustrative and are not meant to be limiting.

EXAMPLE

A sophisticated biological process computer model that incorporated biological nitrification, denitrification, and phosphorus removal was used to confirm that the proposed step feed process would be capable of achieving significant biological phosphorus removal while also accomplishing nitrification. The model used for this exercise has previously demonstrated its ability to accurately simulate the performance of other proven biological phosphorus removal processes. The step feed process evaluated was as essentially illustrated in FIG. 2. The simulations were conducted at reactor hydraulic residence times of 9.5 and 11.6 hours.

Table 1 below summarizes the results of several simulation runs at average summer (i.e., 20° C.) conditions. These simulations demonstrated several things. First, significant phosphorus removal was obtained. Between 3.4 and 7.8 mg P/l of soluble phosphate was removed, compared to a range of 0.5 to 1.0 mg P/l which normally would be removed in a conventional step feed process. Second, a high degree of nitrification is evidenced by effluent ammonia concentrations below 1 mg N/l. Note that the effluent ammonia concentrations would exceed 25 mg N/l if nitrification was not occurring. Third, the precise process configuration affects performance, meaning that significant opportunities exist to optimize performance. Finally, process performance is improved by the presence of high levels of volatile fatty acids (VFA) in the process influent.

TABLE 1

| AFFECT OF PROCESS CONFIGURATION AT HIGH TEMPERATURE | | | | | | |
|---|---|---|---|---|---|---|
| Temperature | VFA | % of Influent to Each Step Feed Point | | | Soluble Phosphorus Removed | Effluent Ammonia |
| (°C.) | (mg/l) | 1 | 2 | 3 | (mg P/l) | (mg N/l) |
| 20 | 30 | 40 | 40 | 20 | 3.4 | 0.7 |

TABLE 1-continued

AFFECT OF PROCESS CONFIGURATION AT HIGH TEMPERATURE

| Temperature (°C.) | VFA (mg/l) | % of Influent to Each Step Feed Point | | | Soluble Phosphorus Removed (mg P/l) | Effluent Ammonia (mg N/l) |
|---|---|---|---|---|---|---|
| | | 1 | 2 | 3 | | |
| 20 | 30 | 60 | 30 | 10 | 5.8 | 0.2 |
| 20 | 30 | 80 | 20 | 0 | 6.2 | 0.2 |
| 20 | 120 | 60 | 30 | 10 | 7.3 | 0.3 |
| 20 | 120 | 80 | 20 | 0 | 7.8 | 0.2 |

Table 2 illustrates the impact of temperature on process performance based upon several simulation runs at different temperatures. As expected, reduced operating temperature results in a reduced degree of nitrification as indicated by higher effluent ammonia concentrations. However, biological phosphorus removal is not adversely impacted and may, in fact, be improved.

TABLE 2

AFFECT OF TEMPERATURE AND VFA'S

| Temperature (°C.) | VFA (mg/l) | % of Influent to Each Step Feed Point | | | Soluble Phosphorus Removed (mg P/l) | Effluent Ammonia (mg N/l) |
|---|---|---|---|---|---|---|
| | | 1 | 2 | 3 | | |
| 20 | 120 | 60 | 30 | 10 | 7.3 | 0.3 |
| 15 | 120 | 60 | 30 | 10 | 7.7 | 0.7 |
| 12 | 120 | 60 | 30 | 10 | 7.7 | 6.5 |
| 20 | 30 | 60 | 30 | 10 | 5.8 | 0.2 |
| 12 | 30 | 60 | 30 | 10 | 6.4 | 0.7 |

These results confirm the viability of the step feed biological phosphorus removal process of the present invention and confirm its advantages relative to conventional biological phosphorus removal systems. As can be seen by Tables 1 and 2, the step feed wastewater treatment process according to the invention provides both high levels of phosphorous and nitrogen removal simultaneously. These benefits can be realized without employing any additional tankage or other facilities. In fact, these results were obtained using a reduction in total process reactor tankage of 20 to 40% in comparison to conventional biological phosphorous and nitrogen removal systems. This is achieved as a result of the use of step feeding and the increase in MLSS concentration within the wastewater treatment plant. Additionally, this process can be retrofitted more easily into small waste water treatment plant sites due to the reduced tankage requirements. This allows biological phosphorous removal to be feasible for a wider range of treatment plants, thereby allowing the cost savings associated with biological phosphorous removal to be enjoyed by a wider range of treatment facilities.

Those skilled in the art will recognize that the mean residence times of the waste water spent in the anaerobic zones, anoxic zones and aerobic zones may vary between individual applications. Also, factors such as effluent limits, composition of influent and operating temperature, will affect the parameters of the final design.

Although the invention has been described with preferred embodiments, it is to be understood that variations and modifications may be resorted to as will be apparent to those skilled in the art. Such variations and modifications are to be considered within the purview and the scope of the claims appended hereto.

We claim:

1. A step feed activated sludge wastewater purification process for biological phosphorus removal, comprising treating wastewater in at least one treatment stage, each treatment stage comprising
   (a) treating wastewater influent in at least one upstream aerobic zone;
   (b) feeding effluent from said at least one upstream aerobic zone through at least one anoxic zone;
   (c) recycling a portion of effluent from said at least one anoxic zone to at least one anaerobic zone, with raw or pretreated wastewater being fed into a step feed point in said anaerobic zone;
   (d) returning effluent from said at least one anaerobic zone to said at least one anoxic zone; and
   (e) feeding effluent from said at least one anoxic zone to at least one downstream aerobic zone.

2. The process according to claim 1, wherein said steps (a)–(e) are repeated at least once in a series of treatment stages.

3. The process according to claim 2, wherein said wastewater influent is introduced into more than one of said anaerobic zones.

4. The process according to claim 1, wherein return activated sludge from a clarifier following said at least one treatment stage is recycled to said at least one anoxic zone.

5. The process of claim 1, wherein multiple step feed points are arranged in a series of consecutive treatment stages.

6. The process according to claim 5, wherein there are at least 3 of said step feed points.

7. The process according to claim 1, wherein mixed liquor effluent from said at least one upstream aerobic zone is recycled to said at least one anoxic zone.

8. A process for waste water treatment according to claim 1, which further comprises preliminary treatment.

9. The process of claim 8, wherein multiple step feed points are arranged in a series of consecutive treatment stages.

10. A step feed activated sludge wastewater purification process for biological phosphorus removal, comprising
    (a) treating wastewater influent in at least one aerobic zone,
    (b) feeding effluent from said at least one aerobic zone through at least one anoxic zone,
    (c) recycling a portion of effluent from said at least one anoxic zone to at least one anaerobic zone, with raw or pretreated wastewater being fed into said anaerobic zone,
    (d) returning effluent from said at least one anaerobic zone to said at least one anoxic zone, and
    (e) feeding effluent from said at least one anoxic zone to at least one downstream aerobic zone;
    said steps (a)–(e) comprising a treatment stage with the waste water purification process comprising more than one treatment stage; and
    with return activated sludge being recycled to said at least one anoxic zone.

* * * * *